Patented Oct. 11, 1932

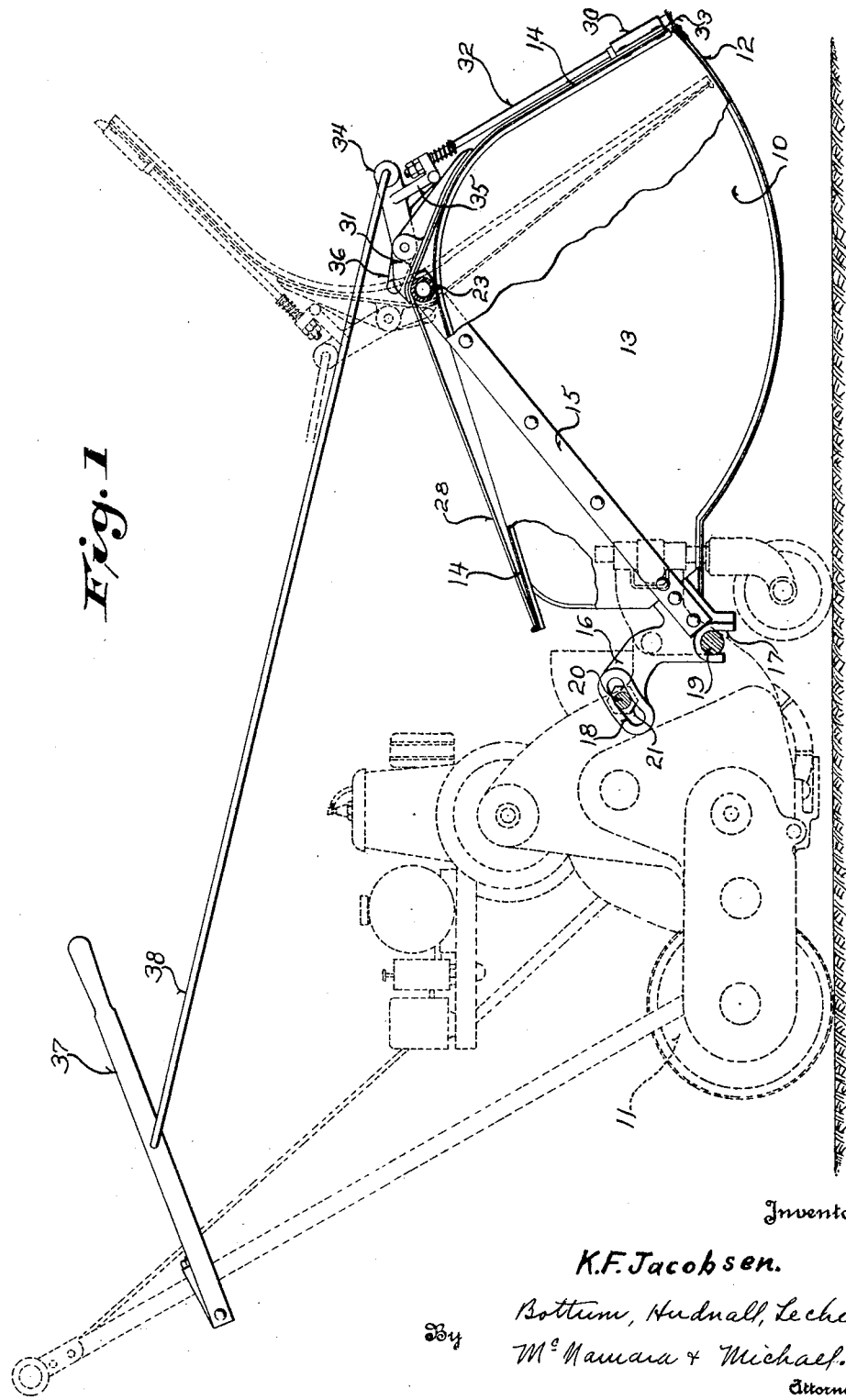

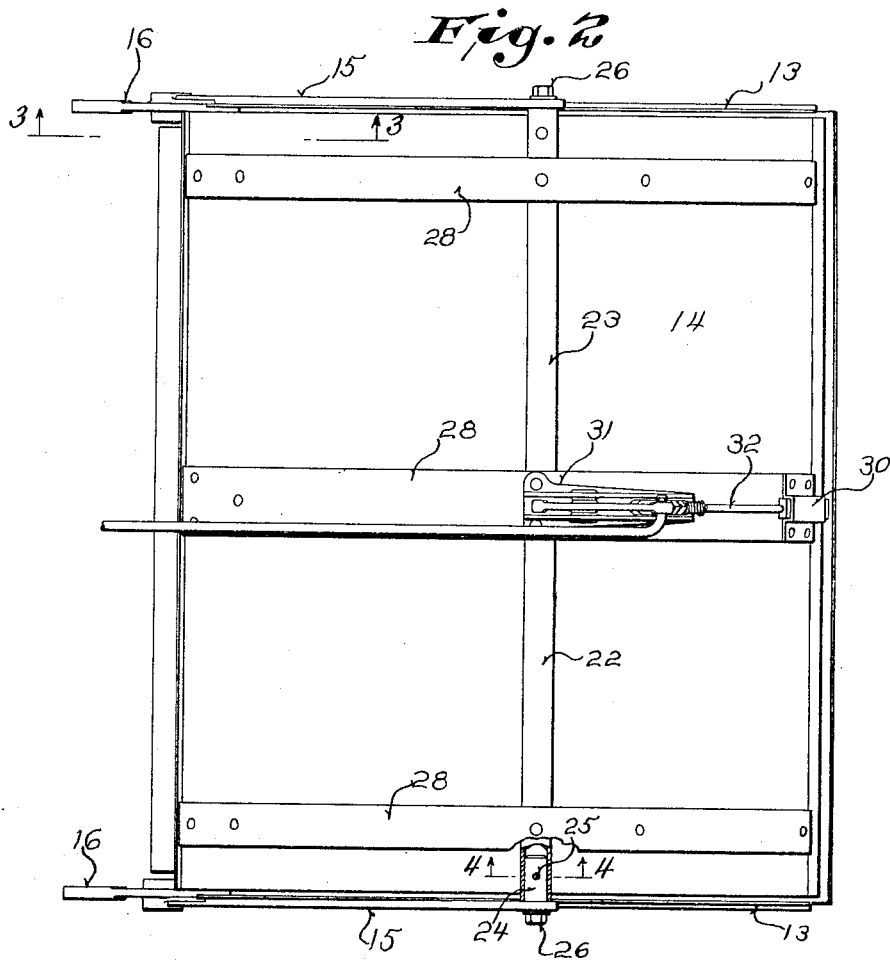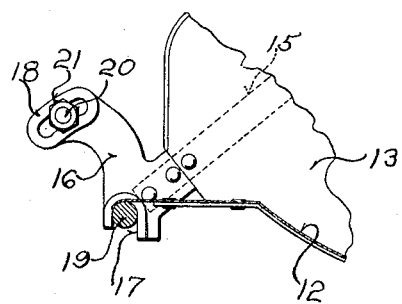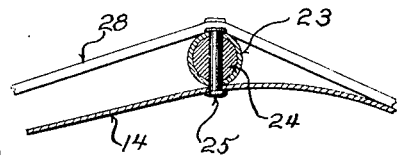

1,881,618

UNITED STATES PATENT OFFICE

KNUD F. JACOBSEN, OF RACINE, WISCONSIN, ASSIGNOR TO JACOBSEN MFG. COMPANY, OF RACINE, WISCONSIN, A CORPORATION OF WISCONSIN

GRASS CATCHER FOR LAWN MOWERS

Application filed August 8, 1929. Serial No. 384,350.

This invention relates to grass catchers for lawn mowers and more particularly to catchers adapted to be quickly emptied.

Grass catchers as heretofore generally used have been so constructed as it was necessary to detach them from the mower in order to empty them. This resulted in considerable inconvenience and waste of time.

An object of the present invention is to provide for the quick dumping of a grass catcher without detaching it from a mower.

A further object is to provide a catcher which is particularly adapted for use with power driven mowers and which may be manipulated from a point on the steering handle of the mower.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a side view of a grass catcher in position on a power driven lawn mower (shown in dotted lines), parts of the catcher being cut away to illustrate the construction and showing in dotted lines a second position for the top thereof;

Figure 2 is a plan view partly in cross section of the catcher of Figure 1;

Figure 3 is a cross sectional view of a portion of the catcher taken on the line 3—3 of Figure 2; and Figure 4 is an enlarged fragmentary cross sectional view taken on the line 4—4 of Figure 2.

In the drawings, the reference numeral 10 refers in general to a grass catcher mounted on the front end of a power driven lawn mower 11 (shown in dotted lines). While the mower may be of any suitable construction, the one shown is of the well known type in which the grass is thrown forwardly as it is cut.

The body of the catcher is preferably made of sheet metal and consists of a curved bottom section 12, a pair of side sections 13 integrally secured to the bottom section and a cover piece 14 pivotally secured thereto. The side sections 13 and bottom section 12 may be secured together by riveting, by clamping cooperating flanges thereon, or by any other well known expedient. For reinforcing these members and for providing means for pivotally mounting the cover 14, strap iron braces 15 are diagonally disposed on the side sections and riveted thereto, these braces projecting beyond the edges thereof. The lower rearwardly projecting ends of the braces are riveted to mounting brackets 16, each of which is provided with an inverted U-shaped slot 17 in its lower edge and a closed slot 18 on its upper angled portion. Each bracket is thus adapted to rest upon a transversely extending rod 19 of the mower and is secured to the frame work thereof by a bolt 20 and nut 21. It is apparent that this means readily permits adjustment of the brackets 16 to raise and lower the grass catcher.

The upwardly projecting ends of the braces 15 are provided with circular holes so that they may be connected by a transversely extending shaft 22 which also serves to pivotally support the cover 14 thereon. In the construction shown, this shaft 22 consists of a hollow pipe 23 with plugs 24 secured in the opposite ends by means of rivets 25. The outer portions of the plugs 24 are reduced in diameter so that they may be interfitted with the holes on the upper ends of the braces 15 and are screw threaded so as to receive securing nuts 26. The pipe 23, plugs 24 and nuts 26 are thus free to rotate as a unit about the upper ends of the braces 15, while at the same time serving as connecting means between the braces. The shoulders formed by reducing the ends of the plugs and the nuts thereon serve to prevent lateral play of the braces on the shaft 22. Of course, the shaft may be constructed in various ways other than that shown.

The cover 14 of the grass catcher is rigidly secured to the shaft 22. For this purpose straps 28 of iron or other suitable material are riveted to the cover and to the pipe 23, these straps preferably passing over the pipe 23 while the sheet metal piece 14 passes beneath the same. In this way the straps serve to strengthen the cover.

The shape and rigidity of the sheet metal parts have an important bearing on the invention. As best shown in Figure 1, the bottom 12 of the catcher is curved to conform to a portion of the surface of a cylinder, the radius of which is the distance from the bottom to the center of the shaft 22. The rearwardly extending portion of the cover 14 is of slightly less length than this radius so that as it is swung to the dotted line position of Figure 1, the rear edge of the cover wipes across the inner surface of the bottom and throws out the grass therefrom.

The forwardly extending portion of the cover may be of any suitable shape and dimension so long as it conforms with that of the forward edges of the side sections 13 and the forward edge of the bottom so as to provide a closed container except for the entrance at the rear.

Means is provided for latching the cover of the grass catcher in position and for manipulating the same from a point adjacent the steering handle of the mower. For this purpose the central strap 28 of the cover is provided with a latch pin guide 30 at its forward end and a bracket 31 for supporting a latching pin 32 at a point near the transversely extending shaft 22. A catch 33 of any suitable construction is mounted on the bottom section 12 of the catcher to cooperate with the latch pin 32 in holding the cover in place.

For actuating the latch pin 32 and the cover 14, a lever 34 is pivotally mounted on the bracket 31. The lever 34 has a downwardly projecting arm 35 loosely connected to the latch pin 32 and a rearwardly extending arm 36 which is adapted to abut against the face of the bracket 31 after the lever is rotated a slight amount. The arm 36 is so angled as to permit sufficient movement of the lever 34 to withdraw the latch pin from the catch after which, upon further movement of the lever, the cover 14 is rotated about the shaft 22.

The upper end of the lever 34 is connected to an operating handle 37 by a link 38. The operating handle may be situated at any convenient point on the steering mechanism of the mower as illustrated in Figure 1.

From the above description it will be evident that the grass catcher is so constructed that grass may be dumped therefrom without disconnecting the same from the mower, the grass being ejected by manipulation of the handle 37 to cause the rear portion of the cover to travel over the curved part of the bottom.

While the embodiment disclosed is particularly useful in connection with a power driven lawn mower, it is obvious that many features of the invention are not limited to any particular type of mower and that various changes may be made in the details of the construction and the arrangement of the parts without departing from the spirit of the invention and the scope of the annexed claims.

The invention claimed is:

1. A grass catcher for lawn mowers including a container, a transversely extending shaft mounted for rotation on the container, and a cover secured to said shaft and normally closing the container except for an entrance at one end, the bottom of said container having a portion curved about the axis of said shaft as a center and said cover having a portion so disposed as to sweep across said curved portion of the bottom as the cover is swung about said shaft.

2. In combination, a container for receiving grass from a lawn mower, a cover for the container pivotally mounted thereon and disposed and adapted to swing across the bottom of the container to eject grass therefrom, and a lever and a link for actuating the cover from a remote point.

3. In combination, a container for receiving grass from a lawn mower, a cover pivotally mounted thereon and disposed and adapted to swing across the bottom thereof to expel grass therefrom, a latch for normally holding the cover in position to form a grass catcher except for an entrance at one end, and means for releasing said latch and actuating said cover from a point remote therefrom.

4. A grass catcher for lawn mowers comprising a container having a bottom and sides, a cover having a portion for closing one end of the container and a top portion overlying the bottom of the container, and means for pivotally mounting the cover on the container so that it may be swung to cause the top portion thereof to sweep across the bottom of the container to eject grass herefrom.

5. A grass catcher for use with lawn mowers having a steering handle and comprising a container having a bottom and sides, a cover having a portion for closing one end of the container and a top portion overlying the bottom of the container, means for pivotally mounting the cover on the container so that it may be swung to cause the top portion thereof to sweep across the bottom of the container to eject grass therefrom, and means for swinging said cover including an actuating lever mounted on the handle of the mower.

6. A grass catcher for use with lawn mowers having a steering handle and comprising a container mounted on the mower in position to receive grass cut thereby, a cover pivotally mounted on said container, a latch for normally holding the cover in position to close the container except for an entrance at one end, a lever mounted on the handle of the mower, and means actuated by the lever for first releasing the latch and then swinging the cover on its pivotal mounting.

7. A grass catcher for use with mowers including a container having a curved bottom and upright sides, means for supporting the container in position to receive grass cut by the mower, a cover having a portion closing one end of the container and a top portion overlying the bottom of the container, means for pivotally supporting the intermediate portion of the cover adjacent the upper portion of the sides of the container whereby when the cover is swung the top portion thereof will sweep across the curved bottom of the container to eject grass therefrom, and means for controlling the position and movement of the cover whereby the cover may be utilized to provide a closed container except for an entrance at one end or as an ejector for grass in the container.

8. A grass catcher for lawn mowers including a sheet metal container having a curved bottom and upright sides, diagonal braces secured to the sides and extending from one end of the container to the upper central portion of the sides thereof, mounting brackets secured to said braces and adapted to be releasably secured to the mower, a cover having a portion for closing one end of the container and a top portion overlying the bottom of the container, means for pivotally supporting the cover on the braces whereby its top portion may be caused to sweep across the curved bottom of the container when the cover is swung, and means for controlling the position and movement of the cover whereby the cover may be caused to cooperate with the container to close the container except for an entrance at one end and also may be utilized to eject grass from the container.

9. A grass catcher for lawn mowers comprising a container having a bottom and upright walls, a cover pivotally mounted on the container and coacting therewith to complete the enclosure afforded thereby, said cover having a portion swingable across the bottom of the container to eject grass therefrom when the cover is rotated about its pivotal mounting and means controlling the position and movement of the cover.

In witness whereof, I hereto affix my signature.

KNUD F. JACOBSEN.